(12) United States Patent
Howard

(10) Patent No.: US 6,392,812 B1
(45) Date of Patent: May 21, 2002

(54) HEAD UP DISPLAYS

(75) Inventor: Richard K Howard, Chatham (GB)

(73) Assignee: BAE Systems Electronics Limited (GB)

( * ) Notice: Subject to any disclaimer, the term of this patent is extended or adjusted under 35 U.S.C. 154(b) by 0 days.

(21) Appl. No.: 09/543,295

(22) Filed: Apr. 5, 2000

(30) Foreign Application Priority Data

Sep. 29, 1999 (GB) .............................................. 9922936

(51) Int. Cl.$^7$ .......................... G02B 27/14; G09G 5/00; G03B 21/28; H04N 9/47
(52) U.S. Cl. ......................... 359/633; 359/630; 345/7; 353/81; 348/115
(58) Field of Search .............................. 345/7; 353/81; 359/630, 631, 632, 633; 348/115

(56) References Cited

U.S. PATENT DOCUMENTS

| | | | | |
|---|---|---|---|---|
| 4,652,870 A | * | 3/1987 | Steward | 359/631 |
| 4,832,449 A | * | 5/1989 | Mundy et al. | 359/630 |
| 4,993,788 A | * | 2/1991 | Steward | 359/13 |
| 5,278,696 A | * | 1/1994 | Suvada | 359/629 |

FOREIGN PATENT DOCUMENTS

| EP | 0303742 A1 | * | 8/1989 | ........... G02B/27/00 |
|---|---|---|---|---|
| GB | 2 154 021 A | | 8/1985 | |
| WO | WO-89/12840 A1 | * | 12/1989 | ........... G02B/27/00 |

* cited by examiner

Primary Examiner—Georgia Epps
Assistant Examiner—David N. Spector
(74) Attorney, Agent, or Firm—Kirschstein, et al.

(57) ABSTRACT

A head up display system 10 comprises an image generator 11 supported and boresighted within a cockpit. The system 10 includes a housing 13 to support the generator 11 and a holographic combiner 14 which is upstandingly supported on top of the housing 13. In operation, the generator 11 forms an image at object surface 17 and a relay lens arrangement 16 receives, collimates and conveys the image along an optical pathway 19 and through an exit pupil 18. A prism 20 and a mirror 21 are arranged along the pathway 19 to fold the pathway 19 from a generally horizontal direction to a generally vertical direction towards the combiner 14. The image enters the prism 20 and is totally internally reflected from a first portion 31 of a first reflection surface 29 towards a first portion 33 of a second reflective surface 30 where it is again totally internally reflected through a second portion 32 of the first surface 29 which allows the image to pas therethrough for reflection by the mirror 21 back through the second portion 32 and through a second portion 34 of the second surface 30 and on to the combiner 14.

12 Claims, 1 Drawing Sheet

HEAD UP DISPLAYS

BACKGROUND OF THE INVENTION

The present invention relates to a head up display system and a method of overlaying a generated image on a scene.

A typical prior art head up display comprises an image generator arranged to generate an image at an object surface thereof, a combiner arranged to overlay the generated image on a scene viewed through the combiner and an optical system disposed between the image generator and the combiner to convey the generated image from the image generator to the combiner. It will be understood that the image formed by the image generator follows an optical path from the object surface, through the optical system, to the combiner.

When such a head up display is used as a pilot's display system in an aircraft cockpit, to accommodate the display within the spatial constraints of the aircraft cockpit, the optical path between the object surface and the combiner is usually folded within the optical system in such a manner that the generated image is redirected between the image generator and the combiner. In such a system, the optical system may comprise a reflector positioned below the combiner, in line with the pilot's ejection plane of the cockpit, such that there is no room available forward of the ejection plane to accommodate additional display arrangements such as a head down display system.

In International Patent Application Publication WO 89/12840 there is described a display which uses two spaced reflective surfaces to reflect an image from three positions arranged along the two reflective surfaces to transfer the image to the combiner. That is the image is generated at an object surface and is redirected upwardly onto the combiner by a lower fully reflective surface and an upper reflective surface having both light transmissive and light reflective properties provided by a semi-silver coating. The two reflective surfaces are arranged to face one another and to taper towards one another in the direction of propagation off the image through the system. In operation, the image from the object surface is reflected first at the lower reflective surface and then reflected, in part, at the upper reflective surface back to the lower surface where it is again reflected to the upper reflective surface for transmission therethrough to the combiner for reflection to an observer.

In this manner, a more compact system is constructed which has a shallower profile than obtained using a reflector which provides a single reflection. However, the transmission efficiency of this system is poor and susceptible to unwanted reflections from various surfaces within the aircraft cockpit and the system.

SUMMARY OF THE INVENTION

It is an object of the present invention to obviate or mitigate the disadvantages associated with the prior art.

According to a first aspect of the present invention a head up display system comprises an image generator arranged to generate an image, a combiner, and an optical sub-system disposed between the image generator and the combiner having a prism comprising first and second reflective surfaces and a mirror having a mirror surface, the prism and the mirror being arranged to convey a generated image from the image generator to the combiner, wherein the prism is arranged to internally reflect a generated image from a first portion of the first reflective surface towards a first portion of the second reflective surface arranged to internally reflect the image through a second portion of the first reflective surface arranged to allow the image to pass therethrough for reflection by the mirror surface of the mirror that is arranged to reflect the image back through the second portion of the first reflective surface and through a second portion of the second reflective surface, arranged to allow the image to pass therethrough, to a reflective surface of the combiner, arranged to overlay the image on a scene viewed through the combiner.

Preferably, the image follows an optical path way through the system and the prism may taper inwardly in the direction of propagation of the image along the optical path way. The first and second reflective surfaces may be planar.

The first portion of the second reflective surface may have a coating on a surface of the prism that is otherwise an optically transparent material. The coating may be a dielectric coating.

The optical sub-system may also comprise a relay lens arrangement disposed between the image generator and the combiner which is arranged to convey an image generated by the image generator to the first portion of the first reflective surface of the optical sub-system.

Preferably, the combiner may be a holographic combiner. The mirror surface of the mirror may be substantially flat. Alternatively, the mirror surface of the mirror may be spherical.

A polarising filter may be disposed between the prism and the combiner.

The combiner may be positioned above the optical sub-system when the system is mounted in an aircraft cockpit for use as a head up display system for a pilot.

According to a second aspect of the invention a method of overlaying a generated image on a scene, includes generating an image, internally reflecting the image from a first portion of a first reflective surface towards a first portion of a second reflective surface, internally reflecting the image through a second portion of the first reflective surface arranged to allow the image to pass therethrough, reflecting the image from a mirror surface back through the second portion of the first reflective surface and through a second portion of the second reflective surface arranged to allow the image to pass therethrough to a reflective surface of a combiner, and overlaying the image on a scene viewed through the combiner.

BRIEF DESCRIPTION OF THE DRAWINGS

The invention will now be described, by way of example only, with reference to the accompanying drawing, in which.

DETAILED DESCRIPTION OF THE PREFERRED EMBODIMENTS

Figure 1:
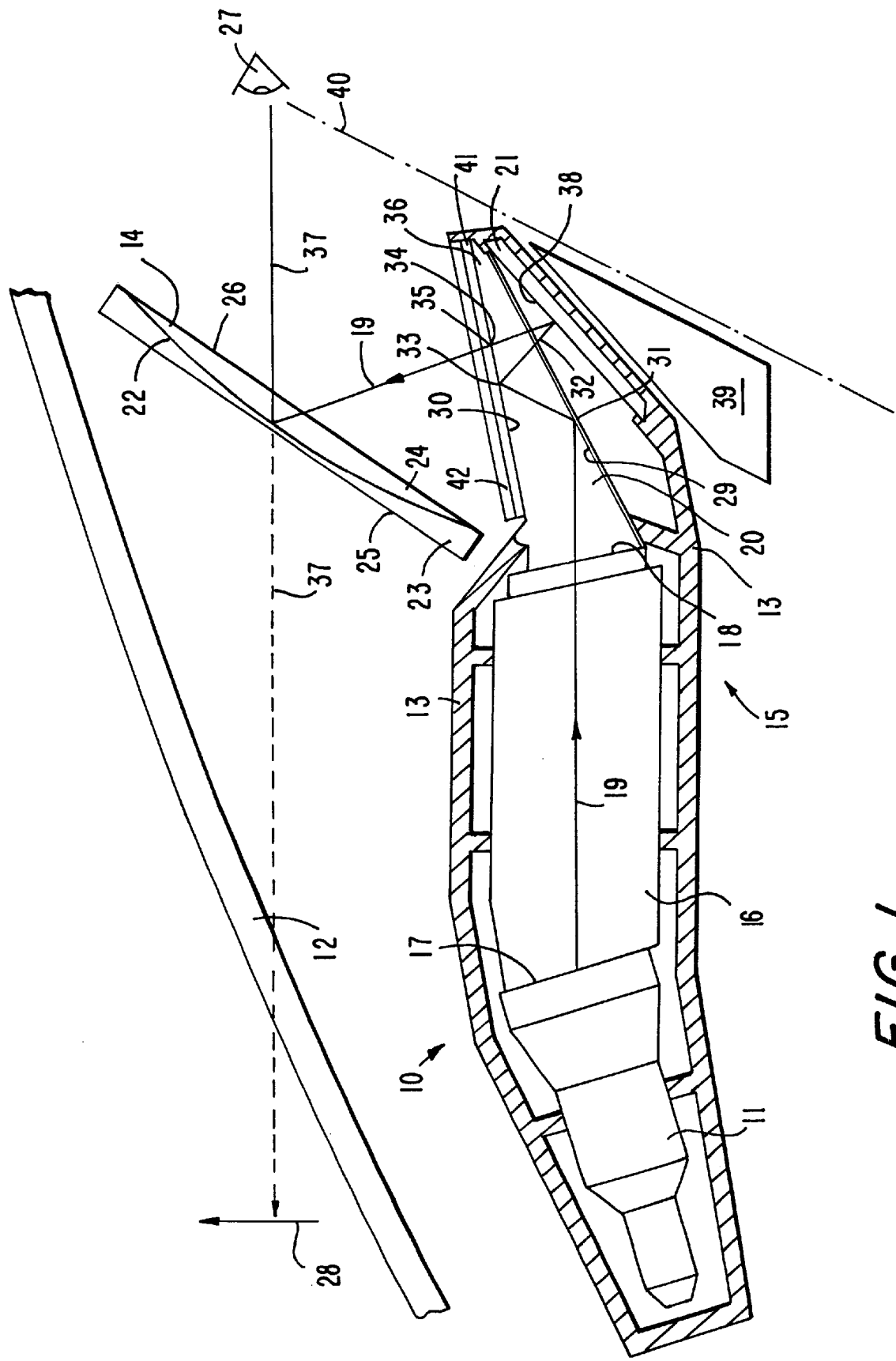
FIG. 1 schematically illustrates a head up display system according to the present invention.

The inventor has realised that the system described in International patent application 89/12840 uses an upper reflective surface which has a semi-silvered coating that results in approximately a 25% transfer efficiency of the image through the system. The low efficiency results from a 50% inefficiency in the reflection from the upper reflective surface and a further 50% transmission inefficiency through the upper reflective surface. In addition there is a further reflection inefficiency from the lower reflective surface and from the combiner used to convey an image to the observer, and a transmission inefficiency within any relay optical components used to convey the image to the two reflective surfaces. In practice, the overall efficiency achievable with this system is no greater than 20%. The use of a multilayer coating in place of the semi-silver coating on the upper reflective surface would improve the efficiency of the system, but this would result in reflection and transmission conflicts at the upper reflective surface due to the similarity of the angles required for the reflection and the transmission requirement of the upper reflective surface. The use of a 50% coating on the upper reflective surface also has a detrimental effect of reflecting back 50% of any light falling on it from above. If the sun is located above the system then the pilot would observe strong reflections of light from the sun. Even the use of a polarising filter will not mitigate the reflection of light from the sun to an acceptable level for viewing by an observer and the transfer efficiency of the image through the polarising filter and upper reflective surface will be reduced by approximately 55%. Therefore, the overall transfer efficiency of the system would be less than 10%.

Referring to FIG. 1, a head up display system 10, comprises an image generator 11 which is supported and boresighted within a cockpit of an aircraft, having a canopy 12, for use by a pilot of the aircraft. The image generator 11 can be a cathode ray tube, a liquid crystal display or other suitable display means. The system 10 also includes a housing 13 used to support the image generator 11 and a holographic combiner 14 which is upstandingly supported on top of the housing 13 in a rigid frame, not illustrated.

Within the housing 13 there is an optical sub-system 15 comprising a relay lens arrangement 16. The relay lens arrangement 16 is constituted by a plurality of lens and other optical elements which are supported by the housing 13 at angles and with relative axial disposition both to one another and in relation to an object surface 17 of the image generator 11. The image generator 11 is arranged to generate an image at the object surface 17 and the relay lens arrangement 16 is arranged to receive the image, to collimate and to convey the image to an exit pupil 18 of the relay lens arrangement 16. It will be understood that the image formed at the object surface 17 follows an optical path way 19 through the system 10 from the object surface 17, through the optical subsystem 15, to the combiner 14.

The optical sub-system 15 further comprises a prism 20 and a mirror 21 arranged along the optical path way 19, between the relay lens arrangement 16 and the combiner 14. The prism 20 and mirror 21 are located within and mounted to the housing 13 and serve to fold the optical path way 19 from a generally horizontal direction to a generally vertical direction, and hence to direct the image from the exit pupil 18 of the relay lens arrangement 16 upwardly to the combiner 14.

The combiner 14 has a holographic reflection lens coating at the interface 22 between two glass or plastic material elements 23 and 24, providing flat and substantially parallel fore and aft surfaces 25, 26 respectively, one on each of the elements 23 and 24. As the combiner 14 is holographic, the coating at the interface 22 is tuned both to the wavelength and for the angle of incidence of the image at each point of its surface. Accordingly, the image generator 11 can be arranged to generate a narrow wavelength band of light and the combiner 14 can be tuned to reflect light within the wavelength band received at a given angle of incidence.

The holographic reflection lens coating at the interface 22 of the combiner 14 is constructed using aberrated wavefronts so that it acts to balance those aberrations within the image generated by the optical sub-system 15. As a result a clear visual image corresponding to that generated at the object surface 17 of the image generator 11 can be viewed at infinity when looking through the combiner 14, superimposed on a scene viewed through the combiner 14. It will be understood that an eye 27 of the pilot views a scene 28, in this case represented by an arrow, forward of the aircraft and through both the combiner 14 and the canopy 12 of the cockpit.

The prism 20 comprises an optically transparent material formed from a glass or plastics material having first and second reflective surfaces, 29 and 30 respectively. The first reflective surface 29 comprises first and second portions, 31 and 32 respectively. The first portion 31 is arranged to totally internally reflect the image within the prism 20 and the second portion 32 is arranged to allow the image to pass therethrough. That is the image passes through the first reflective surface 29 at second portion 32. The second reflective surface 30 comprises first and second portions, 33 and 34. The first portion 33 is arranged to totally internally reflect the image within the prism 20 and the second portion 34 is arranged to allow the image to pass therethrough. That is the image passes through the second reflective surface 30 at second portion 34 which forms an exit aperture 35 of the prism 20.

The first and second reflective surfaces 29 and 30 are substantially co-planar and define a narrowing taper in the direction of propagation of the image through the system 10 along optical path way 19 from the exit pupil 18 of the relay lens arrangement 16. The prism 20 is located with the second reflective surface 30 upmost and a forward edge 36 in the direction of viewing by the eye 27 of the pilot along a viewing path way 37. The prism 20 is also positioned below and immediately adjacent to the combiner 14. The first reflective surface 29 consequentially lies below the second reflective surface 30.

The mirror 21 is located below the prism 20, that is below the second portion 32 of the first reflective surface 29, and comprises a mirror surface 38 which is substantially co-planar with the first and second reflective surfaces 29 and 30. The mirror surface can be flat or spherical with optical power so as to present a larger field of view to the eye 27 of the pilot with less or no head movement on the part of the pilot.

In operation, the image generator 11 produces an image at its object surface 17, which is conveyed by the relay lens arrangement 16 to its exit pupil 18 along the optical path way 19. The image then enters the prism 20 and is totally internally reflected from the first portion 31 of the first reflective surface 29 towards the first portion 33 of the second reflective surface 30 where it totally internally reflected through the second portion 32 of the first reflective surface 29 which is arranged to allow the image to pass therethrough. The image is then reflected by the mirror surface 38 of the mirror 21 which is arranged to reflect the image back through the second portion 32 of the first reflective surface 29 and through the second portion 34 of the second reflective surface 30 which is also arranged to allow the image to pass therethrough. That is the image leaves the prism 20 through its exit aperture 35. The image then falls on to the interface 22 of the combiner 14 which is arranged to overlay the image on the scene 28 viewed by the eye 27 of the pilot through the combiner 14 along the viewing path way 36. In this manner the pilot observes the image at infinity overlaid on the scene 28 viewed through the combiner 14.

It will be observed that, by virtue of the geometry of the prism 20, a space is provided below the prism 20 for the accommodation of a secondary head down display 39 at an ergonomically desirable position, with the entire display arrangements, that is the system 10 and the display 39, accommodated forward of the pilot's ejection plane 40.

It will be appreciated that in view of the limited space in an aircraft cockpit, more particularly a combat aircraft cockpit, the provision of a head up display system 10 which allows an additional head down display 39 to be placed in such an ergonomically desirable position is of great value.

The head down display 39 can be a liquid crystal display with associated electronic driving unit and cooling system. Alternatively, the head down display 39 could be another form of display, such as a cathode ray tube.

It will be understood that whilst the system 10 is primarily intended for use as a pilot's display system in an aircraft cockpit, it can never-the-less find applications in other environments where an additional display 39 is required, for example in a train.

This system 10 provides a good transmission efficiency of the image and is less susceptible to stray reflections within the aircraft cockpit and the system 10. That is the prism 20 provides greater than 90% efficiency as total internal reflection is use to transmit the image through the prism 20 whist the overall system 10 provides greater than 60% efficiency.

A dielectric coating 41 can be applied to the first portion 33 of the second reflective surface 30 so as to extend the angle range of reflection of the image from its surface and to ensure that substantially all of the image is totally internally reflected within the prism 20. Furthermore, the angle at which the second reflective surface 30 of the prism 20 reflects the light from the sun is increased and more of the light from the sun incident on the second reflective surface 30 is transmitted into the system 10 rather than into the eye 27 of the pilot. The inclusion of a polarising filter 42 between the prism 20 and the combiner 14 further reduces the light from the sun being reflected by the system 10 to the eye 27 of the pilot to an acceptable level.

What is claimed is:

1. A head up display system, comprising
    an image generator arranged to generate an image,
    a combiner, and
    an optical sub-system disposed between the image generator and the combiner having a prism comprising first and second reflective surfaces and a mirror having a mirror surface, the prism and the mirror being arranged to convey a generated image from the image generator to the combiner,
    wherein the prism is arranged to internally reflect a generated image from a first portion of the first reflective surface towards a first portion of the second reflective surface arranged to internally reflect the image through a second portion of the first reflective surface arranged to allow the image to pass therethrough for reflection by the mirror surface of the mirror that is arranged to reflect the image back through the second portion of the first reflective surface and through a second portion of the second reflective surface, arranged to allow the image to pass therethrough, to a reflective surface of the combiner, arranged to overlay the image on a scene viewed through the combiner.

2. A head up display system, as in claim 1, wherein the image follows an optical path way through the system and the prism tapers inwardly in the direction of propagation of the image along the optical path way.

3. A head up display system, as in claim 1, wherein the first and second reflective surfaces are planar.

4. A head up display system, as in claim 1, wherein the first portion of the second reflective surface has a coating on a surface of the prism that is otherwise an optically transparent material.

5. A head up display system, as in claim 4, wherein the coating is a dielectric coating.

6. A head up display system, as in claim 1, wherein the optical sub-system also comprises a relay lens arrangement disposed between the image generator and the combiner which is arranged to convey an image generated by the image generator to the first portion of the first reflective surface of the optical sub-system.

7. A head up display system, as in claim 1, wherein the combiner is a holographic combiner.

8. A head up display system, as in claim 1, wherein the mirror surface of the mirror is substantially flat.

9. A head up display system, as in claim 1, wherein the mirror surface of the mirror is spherical.

10. A head up display system, as in claim 1, wherein a polarising filter is disposed between the prism and the combiner.

11. A head up display system, as in claim 1, in an aircraft cockpit for use as a head up display system for a pilot, wherein the combiner is positioned above the optical sub-system.

12. A method of overlaying a generated image on a scene, including
    generating an image,
    internally reflecting the image from a first portion of a first reflective surface towards
    a first portion of a second reflective surface,
    internally reflecting the image through a second portion of the first reflective surface arranged to allow the image to pass therethrough,
    reflecting the image from a mirror surface back through the second portion of the first reflective surface and through a second portion of the second reflective surface arranged to allow the image to pass therethrough to a reflective surface of a combiner, and
    overlaying the image on a scene viewed through the combiner.

* * * * *